UNITED STATES PATENT OFFICE.

CARL A. STETEFELDT, OF SAN FRANCISCO, CALIFORNIA.

IMPROVEMENT IN PROCESSES OF REDUCING SILVER ORES.

Specification forming part of Letters Patent No. 196,262, dated October 16, 1877; application filed March 15, 1877.

*To all whom it may concern:*

Be it known that I, CARL A. STETEFELDT, of the city and county of San Francisco, and State of California, have invented an Improved Process for Reducing Silver Ores; and I do hereby declare the following to be a full, clear, and exact description thereof.

In the amalgamation of roasted and chloridized silver ores, iron is used exclusively to reduce the chloride of silver to metallic silver previous to its amalgamation. The time which is required to amalgamate a charge of ore in a pan is at least eight hours, and if barrels are used, from sixteen to twenty hours.

I have discovered that the amalgamation can be perfected in much less time if zinc is used for the reduction of the chloride of silver, the action of zinc in the reduction of the chloride of silver being well known. The time of amalgamating a charge in a pan is then shortened to four hours, and with some ores even to two hours, whereby a great saving in power and in the original outlay of constructing the mill is effected.

My improved process is operated as follows, viz: After the pan or barrel has been charged with the roasted ore, the proper amount of granulated zinc, which has been moistened with dilute sulphuric or hydrochloric acid, is added, together with the usual quantity of quicksilver. The zinc is at once taken up by the quicksilver and distributed, as zinc amalgam, through the mass of the ore, and the reduction of the chloride of silver and its amalgamation take place at the same time.

The amount of zinc required for one ton of ore is ascertained as follows, viz: The equivalent weight of silver being 108, and that of zinc 32.5, it is near enough for practical purposes to take three-tenths of an ounce of zinc for every ounce of silver contained in a ton of ore. If, however, the bullion resulting in amalgamation is not very fine, but copper and lead enter into its composition, an additional amount of zinc is required for the reduction of these metals. This additional amount is determined as follows, viz: Find the fineness of the bullion, and how much of the base metals is copper and how much is lead; then take, for every ounce of copper which amalgamates from one ton of ore, one ounce of zinc, and for every ounce of lead three-tenths of an ounce of zinc. This is sufficiently accurate for practical purposes, the equivalent weight of copper being 31.7, of lead, 103.6, and of zinc 32.5. Another mode of operating is to use a surplus of zinc, and then to work the accumulated amalgam with a fresh charge of ore in a barrel, in order to extract the surplus of zinc.

Having thus described my invention, what I claim, and desire to secure by Letters Patent, is—

The process of obtaining silver from its ores, which consists in subjecting the roasted and chloridized silver ores to the action of zinc or zinc amalgam and quicksilver, substantially as above described.

In witness whereof I have hereunto set my hand and seal.

CARL A. STETEFELDT. [L. S.]

Witnesses:
  JNO. L. BOONE,
  FRANK A. BROOKS.